(12) United States Patent
Baarman et al.

(10) Patent No.: US 6,939,470 B2
(45) Date of Patent: Sep. 6, 2005

(54) AUTOMATIC SHUT-OFF FOR WATER TREATMENT SYSTEM

(75) Inventors: David W. Baarman, Fennville, MI (US); Eric K. Bartkus, Ada, MI (US)

(73) Assignee: Access Business Group International LLC, Ada, MI (US)

( * ) Notice: Subject to any disclaimer, the term of this patent is extended or adjusted under 35 U.S.C. 154(b) by 108 days.

(21) Appl. No.: 10/244,721

(22) Filed: Sep. 16, 2002

(65) Prior Publication Data

US 2004/0050790 A1 Mar. 18, 2004

(51) Int. Cl.⁷ .......................... G01M 3/26; B01D 61/00
(52) U.S. Cl. .................. 210/739; 210/767; 340/605
(58) Field of Search ................................ 210/767, 639, 210/103; 340/605, 606, 607, 608, 611; 137/15.11, 12, 14, 487; 73/40, 40.5 R

(56) References Cited

U.S. PATENT DOCUMENTS

| 2,488,770 A | 11/1949 | Foulds |
| 4,681,677 A | 7/1987 | Kuh et al. |
| 4,737,173 A | 4/1988 | Kudirka et al. |
| 5,070,220 A | 12/1991 | Glenn |
| 5,127,555 A | 7/1992 | Mittermaier |
| 5,135,645 A | 8/1992 | Sklenak et al. |
| 5,536,395 A | 7/1996 | Kuennen et al. |
| 5,616,172 A | 4/1997 | Tuckerman et al. |
| 5,693,226 A | 12/1997 | Kool |
| 5,698,091 A | 12/1997 | Kuennen et al. |
| RE35,871 E | 8/1998 | Bundy et al. |
| 5,853,572 A | 12/1998 | Kuennen et al. |
| 5,997,619 A | 12/1999 | Knuth et al. |

FOREIGN PATENT DOCUMENTS

| JP | 60-25510 | 2/1985 | |
| JP | 9085238 | 3/1997 | |
| WO | WO 9823936 A1 * | 6/1998 | ............ G01M/3/28 |
| WO | WO0078681 | 12/2000 | |

* cited by examiner

Primary Examiner—Terry K. Cecil
(74) Attorney, Agent, or Firm—Warner Norcross & Judd LLP

(57) ABSTRACT

A water treatment system including an automatic shut-off control valve. The system preferably includes inflow and outflow sensors that monitor flow through the system and a pressure sensor that senses back pressure in a downstream plumbing system. If the sensors sense different flows, a leak in the system is assumed and the control valve is closed. In one embodiment, the flowing back pressure is monitored by the pressure sensor to detect leaks in the plumbing system. In another embodiment, the valve is closed after a specific volume of water flow is sensed and the pressure sensor measures static back pressure in the plumbing system to detect a leak. In yet another embodiment, incremental amounts of water are released by the valve and subsequent back pressures are tested to detect a leak. Optionally, the system includes a control to shut-off a water supply when a water treatment device enclosure is accessed.

11 Claims, 1 Drawing Sheet

AUTOMATIC SHUT-OFF FOR WATER TREATMENT SYSTEM

BACKGROUND

The present invention relates to a liquid treatment system and more particularly to point-of-use water treatment systems.

Liquid treatment systems are commonly used to treat liquid in a distribution system. Such treatment systems typically remove contaminants from or alter contaminates in liquid to reduce consumption and use problems or enhance the aesthetic quality of the liquid.

A specific type of liquid treatment system is a water treatment system, which commonly is used in a water distribution system. A water treatment system removes pathogens, chemical contaminates, and turbidity from water that is used for human consumption. Water treatment systems may employ filtration components, ion exchange components, ultraviolet radiation components and the like to treat water as it flows through the water treatment system from a water supply to a point of distribution, for example, a faucet in a building.

Conventional water treatment systems connect a municipal or private pressurized water supply to a water distribution system. For example, an under-counter water treatment system, of the type used in residences or businesses, provides fluid communication between a pressurized water supply line and a faucet. As the water flows through the system, the system treats the water before it exits the faucet.

Although conventional water treatment systems provide a way to remove unwanted chemicals, pathogens and other contaminants from water, they suffer several shortcomings. First, water treatment systems typically are connected to a high pressure (e.g. 50 to 90 pounds per square inch) water supply. Under such high pressure, the systems occasionally fail as a result of a manufacturing defect, a design defect, end-user abuse or a pressure surge in the water supply. If severe enough, a pressure surge may rupture the water treatment system components, and result in an uncontrolled release of water from the system. Such a release has the potential to cause significant flood damage to the building or structure in which the water treatment system is located.

Some water treatment systems, for example, the system in U.S. Pat. No. 5,536,395 to Kuennen, include electric current interrupters that automatically disconnect the water treatment system from an electric source when water starts to leak onto electronic components in the system. Although this approach prevents electrocution of bystanders and damage to the electric supply, the system remains under pressure and thus still may cause water damage.

A second problem associated with conventional water treatment systems is that most include consumable components, for example, filters, ultraviolet bulbs and ion exchange chemicals that require occasional maintenance or replacement. This requires that the water supply be disconnected from the water treatment system to avoid spillage of water when the component is removed. This makes maintenance of the water treatment system time consuming and, in some cases, complex. Kuennen offers a solution to this problem as well by outfitting a filter with a system of check valves that automatically close once the filter is removed for maintenance. Accordingly, the water supply is shut-off and theoretically does not leak from the water treatment system. In some instances, however, if the check valves are abused by end-users, it is possible that water may leak from the check valves because the system remains under pressure. Moreover, if the filter cartridge of Kuennen is forcibly and improperly replaced, the check valves may remain stuck open, causing a slow leakage problem.

A third problem common to conventional water treatment systems is that if the plumbing downstream of the water treatment system bursts or ruptures, for example, due to freezing, the water treatment system allows water to flow freely to the burst or leaking region.

SUMMARY OF THE INVENTION

The aforementioned problems are overcome in the present invention wherein a water treatment system with an automated control valve is provided to shut-off water flow to prevent leakage from the water treatment system and plumbing downstream of the water treatment system.

In a first embodiment, the water treatment system includes an inflow sensor and a control valve. The inflow sensor measures the inflow of water into the water treatment system. If the sensor detects an abnormally high flow, e.g., the type of high flow indicative of a downstream leak, then the control valve is closed to protect against a loss of containment of water by the water treatment system or any plumbing located downstream from the water treatment system. Optionally, an outflow flow sensor at the outflow end of the system cooperates with the inflow flow sensor to provide a running mass balance of water inflow and water outflow and determine if the water treatment system is leaking.

In a second embodiment, the water treatment system includes a maintenance flow shut-off control to close the control valve during maintenance or replacement of a consumable component, for example, a water treatment device such as a filter or ultraviolet lamp assembly. In a preferred embodiment, the component is mounted in an enclosure having an access panel. The maintenance flow shut-off control senses when the access panel is opened and thereby causes the control valve to close and shut-off the water supply.

In a third embodiment, the water treatment system includes a shut-off control to prevent water damage created by ruptured downstream plumbing lines or slow leaks from accidentally left-open faucets at points of distribution. A pressure sensor measures back pressure in the plumbing system and this measured back pressure is compared to a predefined back pressure. If the measured back pressure is less than the predefined back pressure, the system indicates to a user that a downstream plumbing system failure has occurred and, optionally, closes the control valve to prevent further water damage.

In another aspect of this embodiment, the system distributes specific volumes of water. After the specific volume is distributed, the system tests the integrity of downstream plumbing by opening and closing the control valve. A pressure sensor downstream of the volume measures back pressure. If back pressure in the downstream plumbing system increases, then the processor "re-sets" so that another specific volume of water may flow through the system.

The water treatment system of the present invention offers several benefits. First, if the water treatment system leaks or bursts due to excessive pressure, the system shuts off its water supply to prevent further water damage to the system and surroundings. Second, the system provides a safer and more reliable shut-off mechanism to allow the removal and replacement of consumable components of the water treatment system. Third, the system provides protection against leaks and pipe failures in a plumbing system downstream from the water treatment system by detecting such failures and leaks and providing a control to shut-off the water supply through the water treatment system.

These and other objects, advantages and features of the invention will be more readily understood and appreciated by reference to the detailed description of the invention and the drawing.

DETAILED DESCRIPTION OF THE INVENTION

I. Construction Overview

Figure 1:
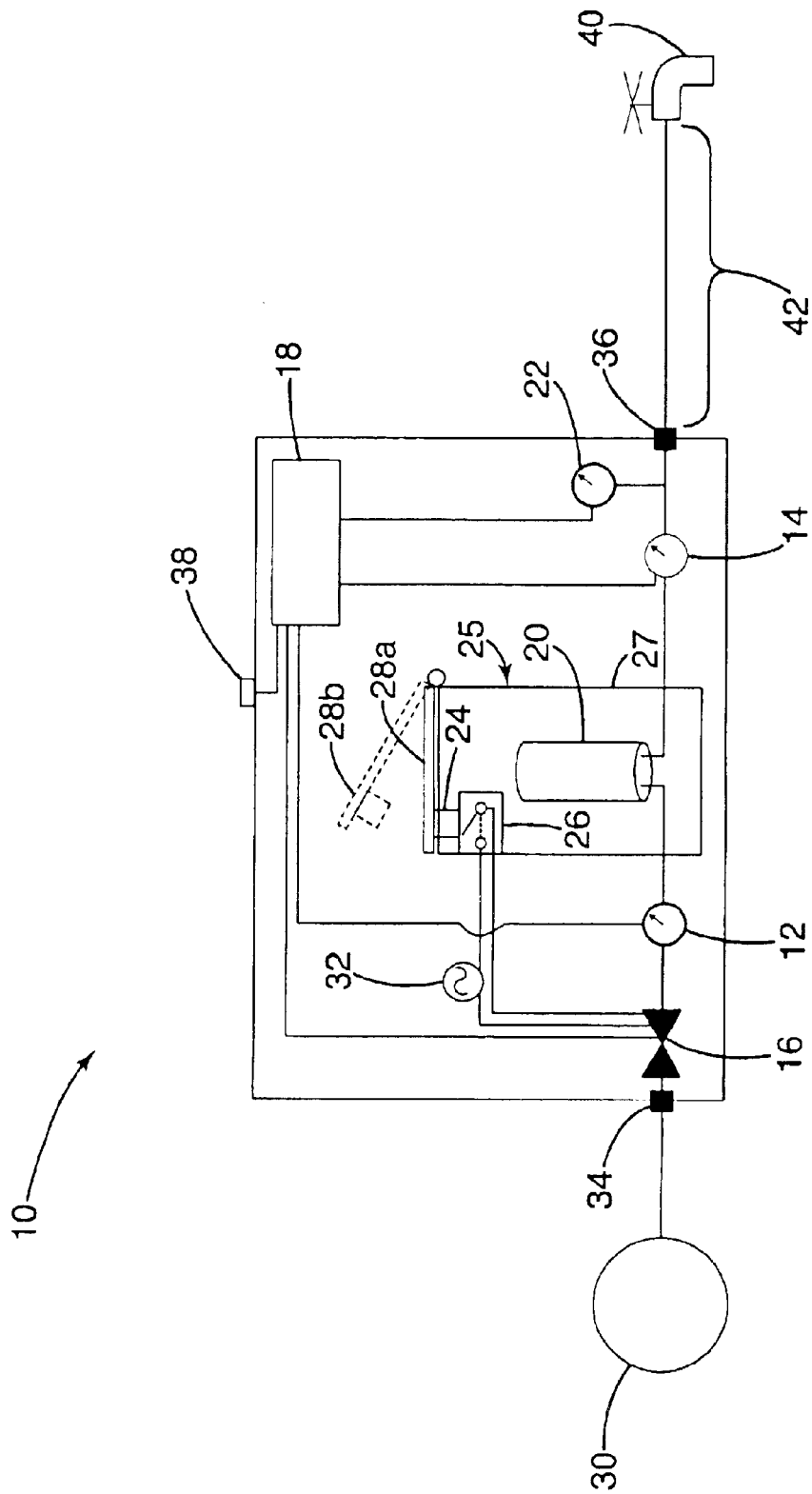
FIG. 1 is a schematic of the water treatment system of the present invention.

A water treatment system manufactured in accordance with an embodiment of the present invention is shown in FIG. 1 and generally designated 10. The water treatment system is in fluid communication with a water supply 30 and a point of use 40, which for example, may be a faucet or multiple faucets within a building or distribution system. Plumbing system 42 provides the communication between the water treatment system 10 and the faucet 40.

The water treatment system 10 generally includes in an inflow control valve 16, inflow sensor 12, a water treatment device 25, outflow sensor 14 and a pressure sensor 22. The inflow control valve 16 is controlled by the processor 18. Inflow 12 and outflow 14 sensors, as well as pressure sensor 22 are in communication with the processor 18 so that the processor may monitor different operating parameters as described below. The inflow control valve 16, inflow sensor 12, water treatment device 25, outflow sensor 14 and pressure sensor 22 preferably are in fluid communication between the inlet 34 and outlet 36 of the water treatment system 10.

With further reference to FIG. 1, the flow sensors 12 and 14 are commercially available flow meters, for example, magnetic flow meters available from SeaMetrics, Inc., of Kent, Wash., USA. Magnetic flow meters are described in Chapter 14 of the *Water Measurement Manual,* 3rd Ed., U.S. Dept. of Agriculture, Bureau of Reclamation (1997). Optionally, the flow sensors may use a Flow Switch as described in U.S. Pat. No. 5,070,220 to Glenn, or any of the other wide variety of water flow meters described therein.

As shown, the inflow 12 and outflow 14 sensors are in electrical communication with the processor so that the processor may obtain flow information therefrom. Optionally, the communication between the sensors and the processor, or between any of the various components of the water treatment system 10 may be established with any conventional communication system, such as an infrared systems, near-infrared systems, radio frequency systems and the like.

The inflow control valve of the embodiment illustrated in FIG. 1 may be any operable valve adapted to control or prevent flow therethrough. An example of such a valve is an electrical solenoid valve that converts from an open position to a closed position when energized. Such an electric solenoid valve is commercially available under the 3000 Series from Skinner Valve Division of Parker Hannifin Corporation, New Britain, Conn., USA. As illustrated, the inflow control valve may be actuated by the processor 18.

The water treatment system 10 may further include a pressure sensor 22, also in communication with the processor 18. The pressure sensor is in fluid communication with the downstream plumbing system 42 and is adapted to sense the pressure in that system 42. The pressure information may be relayed to the processor 18 for analysis and implementation of control operations as described further below.

The processor 18 is preferably a conventional microprocessor or any "smart" device adapted to obtain measurements from flow sensors 12 and 14, and optionally switch 26, sensor 22, or other components of the system 10 to subsequently control components of the system, including the inflow control valve 16.

The water treatment device 25 includes an enclosure 27 in which consumable component 20 is enclosed. The consumable component may be any conventional water treatment media or apparatus, for example: a dead-end particulate filter; a carbon adsorbent; an ion exchange device; polymeric adsorbent media; a bypass separation membrane, such as an ultra-filtration filter, a nano-filtration filter or reverse osmosis device; and/or a catalytic device, such as an ultraviolet light assembly. Preferably, the water treatment device 25 is a closed pressure vessel having a closure lid 28, adapted to open to the position 28b to provide access for replacement and maintenance of the consumable component 20.

Optionally, the water treatment device 25 includes a switch 26 that actuates the inflow of control valve 16 to shut-off the water supply to the water treatment device 25 during maintenance. The switch 26 may be a reed switch as shown. The switch is held open by magnet 24 when the access panel 28 is in the closed position as shown in full lines. When the access panel 28 is opened, as shown in broken lines, the magnet 24 is moved away from the reed switch allowing it to close and complete a circuit. Accordingly, a source voltage, which may be AC or DC current, actuates the inflow control valve thereby closing it and preventing or restricting flow through the system 10. Alternatively, the reed switch may be in communication with the processor 18 to relay information to the processor that the access panel is in the open position 28b so that the processor closes the inflow control valve 16. In another alternative configuration, the reed switch is open when the access panel is moved to the opened position 28b, causing the inflow control valve to open when energized or close when the device is opened. Although the reed switch is employed as the control switch in this embodiment, it should be understood that the present invention contemplates any structure that is capable of opening and closing the inflow control valve when the enclosure is accessed or when the consumable component is manipulated.

II. Containment Loss Shut-Off

With reference to FIG. 1, there will now be described the operation of the illustrated embodiment to limit flow under normal operation and during loss of containment of the water treatment system 10. Loss of containment may occur, when, for example, the system's components fail and water begins to leak from the internal plumbing or components of the system or the water treatment device 25.

In one mode of operation, inflow sensor 12 senses the amount of water flowing into the water treatment system 10 from the water supply 30 and outflow sensor 14 senses the amount of water flowing out from the water treatment system 10. This information is relayed to the processor 18 which compares the flow sensed by the inflow sensor 12 to the flow sensed by the outflow sensor 14. If the flow sensed by inflow sensor 12 exceeds the flow sensed by outflow sensor 14, then processor 18 activates the inflow control valve to close and prevent water from flowing into the water treatment system 10. By so doing, excessive leakage from the water treatment system 10 and thus resultant water loss and damage is minimized.

Optionally, the processor 18 may additionally or alternatively compare the flow detected by the inflow sensor 12 and/or the outflow sensor 14 with stored or calculated flow rates. If the processor determines that the flow sensed by the inflow sensor 12, the outflow sensor 14, or both have reached a threshold value, then the processor controls the inflow control valve 16 to reduce or shut-off water flow through the water treatment system 10.

III. Maintenance Flow Shut-off

There will now be described a method for interrupting water supply to the water treatment system 10 when performing maintenance or repair on the water treatment device 25 (or other components), in particular, removing or replacing consumable component 20 from the water treatment device 25.

As shown, when the access panel of the water treatment device 25 is opened from a closed position 28a to open position 28b (shown in broken lines), the magnet is displaced from the reed switch 26. In so doing, the reed switch closes as shown in broken lines completing the circuit with the inflow control valve. Accordingly, the source voltage 32, which may be energized or powered by an electrical source that powers the water treatment system 10 (not shown), closes the inflow control valve 16, thereby preventing water from being further supplied into the system, in particular, to the water treatment device 25. After the consumable component 20 is serviced and the access panel 28 is replaced in its closed position 28a, the reed switch again opens thereby deactivating and opening the inflow control valve 16 so that pressurized water source 30 is again in communication with the water treatment device 25 and downstream components.

IV. Downstream Plumbing System Test and System Shut-Off

With reference to FIG. 1, a process of the present invention for testing the plumbing system to reduce or eliminate water damage or loss will be described. Generally, the water treatment system 10 protects against leaks in the downstream plumbing system 42. Such leaks may be large, such as those caused by burst pipes, or small, such as those caused by accidentally left-open water faucets or leaks in plumbing joints.

The system monitors the flowing and/or static back pressure in the plumbing system to test for and detect losses in the system. This testing may be carried out in several ways.

Generally, pressure sensor 22 is in fluid communication with the downstream plumbing system 42 and able to sense the static and flowing back pressure in that system. Static back pressure refers to the pressure in the system when the system is closed. Flowing back pressure refers to pressure in the system when water is flowing in the plumbing system, for example, when a distribution point (e.g., faucet 40) is open. Pressure information from the sensor 22 is relayed to the processor 18, which may include stored, pre-set or calculated flowing or static back pressures that are specific to a normally operating, non-leaking plumbing system 42. If a measured pressure differs from a stored, pre-set pressure, then the processor controls inflow control valve 16 to prevent water leakage from the plumbing system 42 and/or the water treatment system 10.

In one embodiment, the flowing back pressure of the plumbing system 42 is measured by pressure sensor 22 and compared by the processor 18 to a stored, pre-set, or calculated flowing back pressure by the processor 18. If the measured flowing back pressure is less than the stored flowing back pressure (which is typically indicative of a leak in the plumbing system or point of distribution), then the processor closes the inflow control valve 16.

Preferably, the stored back pressure stored in the processor 18 is programmable to provide a control that is specific to the piping system in which the water treatment system 10 is installed. More preferably, the stored back pressure is obtained and "pre-set" in the processor 18 when the water system 10 is installed or when the configuration of downstream plumbing system 42 is altered. The back pressure depends on multiple variables unique to the plumbing system, for example, pipe internal diameter, pipe wall smoothness, the curvature of pipe elbows, and other factors.

To set the stored back pressure value, a user opens the faucet 40, or more generally the downstream piping system 42, to a desired "open" position. Preferably, this open position is the maximum open position; however, it may be half or three-quarters or less opened (which yields a higher back pressure) if the user desires to initiate the safety shut-off feature at lower flow rates. After the faucet is opened to the desired position, the pressure sensor 22 senses the back pressure and relays that information to the processor 18. Either automatically or via user input, the processor 18 records the back pressure detected by the pressure sensor 22, and that back pressure value becomes the pre-set back pressure value. This recorded back pressure is then compared by the processor to subsequently sensed back pressures at prescribed times. For example, the back pressure may be tested by the pressure sensor when either or both of the inflow and outflow sensors sense flow through the water treatment system. The pressure sensor also may sense pressure on regular timed intervals, regardless of whether flow is detected through the water treatment system 10 by the inflow 12 and outflow 14 sensors.

In another embodiment, a maximum flow volume is allowed to flow through the system 10, the control valve 16 is closed, and the back pressure in the plumbing system 42 is measured to determine if the valve should be opened. This embodiment provides an additional or alternative safety feature to the flowing back pressure monitoring when the faucet is open and water is freely flowing through the system.

Preferably, a maximum single flow volume is programmed into the processor 18 either by the manufacturer or the consumer. When liquid flows through the inflow sensor 12 (and/or the outflow sensor 14), the processor records the volume of water until the maximum single flow volume is passed by the sensor(s). Then the processor 18 closes the inflow control valve 16 so that no more water can flow through the water treatment system 10 and into the plumbing system 42. The inflow control valve 16 remains closed until the processor is reset to again open the inflow control valve 16.

To reset the processor and thereby restart flow through the water treatment system and out the faucet 40, a user closes the faucet 40. The sensor 22 then measures the back pressure with the faucet closed and relays this information to the processor 18. The processor compares this measured back pressure to the stored flowing back pressure described above and set when the faucet is in the open position. If the measured back pressure is greater than the stored flowing back pressure, a "no leak" situation is detected. Accordingly, the processor resets the recorded flow volume in a water flow register of the processor to "0" or some other pre-specified flow volume, so that when the faucet is again opened it dispenses water until the inflow sensor 12 and/or outflow sensor 14 senses the maximum single flow volume and again closes the inflow control valve 16. Thereafter, the process may be repeated.

The processor optionally may be programmed to reset the water flow register of the processor when the measured back pressure is greater than the pre-set or stored flowing back pressure and/or when the flow of water through the inflow sensor 12 and outflow sensor 14 is "0."

In yet another embodiment, a maximum flow volume is allowed to flow through the system, the valve is closed, and the back pressure in the plumbing system 42 is tested for pressure build-up. Specifically, after the maximum single flow volume is sensed by sensors 12 and/or 14, the processor closes the inflow control valve 16, preventing additional water from flowing through the water treatment system 10 into the plumbing system 42. The processor tests the plumbing system 42 for static back-pressure buildup. To do so, the processor 18 opens and closes the inflow control valve 16 one or more times, releasing test volumes into the system 10 and plumbing system 42. The inflow 12 and/or outflow 14 sensors sense the volume of water that subsequently passes through the water treatment system during each release. A preferred test volume of water is 30 milliliters or less, more preferably 30 milliliters or less, and most preferably 10 milliliters or less. The number of tests for back-pressure buildup is preferably 5 or less, more preferably 3 or less and most preferably 1 or less. As will be appreciated, other volumes and numbers of tests may be used as desired.

Each time test volumes are released, the pressure sensor 22 measures the static back pressure in the system. The processor compares the static back pressure of each release to determine if the static back pressure is increasing or building-up. If the static back pressure is not increasing or building-up, then the processor closes the inflow control valve 16. Preferably, the processor holds the valve 16 closed until manually reset by a user. The processor 18 may indicate that the inflow control valve 16 is closed and requires manual opening via indicator 38. Two examples of the water treatment system 10 operating under this embodiment follows.

In a first example, the processor is programmed to allow a maximum single flow volume of three gallons, and the required amount of water is one gallon. When the faucet 40 is opened for a period of time to allow fluid through the water treatment system sufficient to dispense one gallon of water and then closed, the sensors 12 and 14 measure a flow of one gallon and the processor 18 records this flow. Subsequently, when the sensors 12 and 14 sense no more flow through the water treatment system and the pressure sensor 22 senses a back pressure greater than the pre-set back pressure (due to faucet being closed). The processor resets to "0" so that a maximum single flow volume of three gallons may be dispensed through the water treatment system 10 when the faucet 40 is again opened.

In a second example, the maximum single flow volume is again three gallons, but four gallons of water are required to be dispensed from the faucet 40. A user opens the faucet and flow continues until three gallons are dispensed. The processor senses via the sensors 12 and 14 that the maximum single flow volume has been dispensed and shuts the inflow control valve 16. The processor optionally may indicate that the maximum flow volume has been dispensed via indicator 38, which may be a buzzer or a visual indicator, such as a LED. The user closes the faucet 40 momentarily after the three gallons are dispensed. The processor opens the inflow control valve 16 a predetermined amount to permit a pre-defined amount of water to enter the water treatment system 10 during a predetermined time interval to test the system 10. The processor monitors the back pressure via the pressure sensor 22 and the flow rate via the flow sensors 12 and 14. When the processor 18 determines a back pressure buildup after repeated releases of small test quantities of water and the inflow 12 and outflow 14 sensors indicate "0" flow, the flow register of the processor is reset to "0" so that when the faucet 40 is again opened, the water treatment system 10 will allow three gallons of water to be dispensed through it. Optionally, the processor may indicate via indicator 38 to the user that the user may again dispense water from the faucet 40. The user then again opens the faucet to draw the desired final gallon to make a total of four gallons dispensed through the water treatment system 10. The maximum single flow volume may be adjusted by the user as desired so that this safety feature does not hinder water dispensation.

Optionally, the water treatment system of the present invention may include light sensors in communication with the processor to determine if water treated by water treatment system 10 meets desired turbidity removal standards. Such a system is disclosed in U.S. patent application Ser. No. 09/974,940, filed Oct. 11, 2001, now U.S. Pat. No. 6,669,838 entitled "Method and Apparatus for Filtering and Sterilizing Water Utilizing a Turbidity and Microorganism Sensing System," the full text of which is hereby incorporated by reference. This identified application also discloses the use of visible light sensors in combination with a processor to determine if treated water receives adequate ultraviolet radiation to affect microorganism content in treated water at or less than, a predetermined standard.

The above descriptions are those of the preferred embodiments of the invention. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

What is claimed is:

1. A process for controlling water flow in a water treatment system including a control valve comprising:

measuring an inflow of water entering the water treatment system, the water treatment system in liquid communication with a point of use out from which water is flowing, the water treatment system including an enclosure having an access panel, the enclosure housing a consumable component that is replaceable relative to the water treatment system;

measuring an outflow of water exiting the water treatment system;

comparing the inflow to the outflow;

determining whether the inflow is greater than the outflow;

adjusting the control valve to at least one of reduce the inflow and stop the inflow when the inflow is greater than the outflow;

automatically sensing the positioned of the access panel; and adjusting the control valve to stop the inflow of water when the access panel is at least partially open relative to the enclosure.

2. The process of claim 1 wherein the control valve is at least partially closed when the inflow is less than the outflow.

3. The process of claim 1 wherein the control valve is at least partially closed when the outflow is greater than the inflow.

4. The process of claim 3 wherein the inflow of water is pressurized.

5. A process for controlling water flow through a water treatment system comprising:
  sensing the water flow into the water treatment system, the water treatment system in liquid communication with a point of use out from which water is flowing, the water treatment system including a consumable component housed in an enclosure having an access panel, the consumable component manually replaceable relative to the water treatment system and the enclosure;
  sensing the water flow out of the water treatment system;
  determining whether the water flow into the water treatment system exceeds or is less than the water flow out of the water treatment system;
  interrupting the flow of water out of the water treatment system by at least one of reducing and stopping the flow of water into the water treatment system if the water flow into the water treatment system exceeds the water flow out of the water treatment system;
  automatically sensing the positioned of the access panel; and
  interrupting the flow of water out of the water treatment system when the access panel is at least partially open.

6. The process of claim 5 wherein at least a portion of the water flow into the water treatment system flows through the consumable component and is treated by the consumable component.

7. The process of claim 6 comprising interrupting the flow of water to the consumable component in response to said access panel position sensing step.

8. The process of claim 7 wherein the flow of water to the consumable component is interrupted when the access panel is at least partially open.

9. The process of claim 8 wherein the access panel is in communication with an electrical circuit, wherein when the access panel is at least partially open, the electrical circuit is completed.

10. The process of claim 9 wherein the water treatment system includes a valve, wherein the valve is in communication with the electrical circuit, and comprising actuating the valve to perform said interrupting step when the electric circuit is completed.

11. A process for controlling water flow through a water treatment system comprising:
  sensing the water flow into the water treatment system, the water treatment system including an enclosure having an access panel, the enclosure housing at least one of a dead-end particulate filter, a carbon adsorbent, an ion exchange device, polymeric adsorbent media, a bypass separation device, and a catalytic device;
  sensing the water flow out of the water treatment system;
  automatically sensing the position of the access panel;
  determining whether the water flow into the water treatment system exceeds or is less than the water flow out of the water treatment system;
  interrupting the flow of water out of the water treatment system by at least one of reducing and stopping the flow of water into the water treatment system if the water flow into the water treatment system exceeds the water flow out of the water treatment system; and
  interrupting the flow of water out of the water treatment system when the access panel is at least partially open.

* * * * *

UNITED STATES PATENT AND TRADEMARK OFFICE
CERTIFICATE OF CORRECTION

PATENT NO.    : 6,939,470 B2
DATED         : September 6, 2005
INVENTOR(S)   : Baarman et al.

It is certified that error appears in the above-identified patent and that said Letters Patent is hereby corrected as shown below:

Column 8,
Line 55, "positioned" should be -- position --.

Column 9,
Line 20, "positioned" should be -- position --.

Signed and Sealed this

Twenty-fourth Day of January, 2006

JON W. DUDAS
*Director of the United States Patent and Trademark Office*